US010252388B2

(12) United States Patent
Takahashi

(10) Patent No.: US 10,252,388 B2
(45) Date of Patent: Apr. 9, 2019

(54) FEED AXIS DEVICE OF A MACHINE TOOL

(71) Applicant: MAKINO MILLING MACHINE CO., LTD., Tokyo (JP)

(72) Inventor: Ikuma Takahashi, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 447 days.

(21) Appl. No.: 15/021,627

(22) PCT Filed: Sep. 13, 2013

(86) PCT No.: PCT/JP2013/074897
§ 371 (c)(1),
(2) Date: Mar. 11, 2016

(87) PCT Pub. No.: WO2015/037139
PCT Pub. Date: Mar. 19, 2015

(65) Prior Publication Data
US 2016/0229015 A1 Aug. 11, 2016

(51) Int. Cl.
*B23Q 11/00* (2006.01)
*B23Q 1/54* (2006.01)
(Continued)

(52) U.S. Cl.
CPC ........ *B23Q 11/0032* (2013.01); *B23Q 1/5406* (2013.01); *B23Q 5/162* (2013.01);
(Continued)

(58) Field of Classification Search
CPC ........ B23Q 5/56; B23Q 5/162; B23Q 1/5406; B23Q 11/0032; B23Q 11/126;
(Continued)

(56) References Cited

U.S. PATENT DOCUMENTS 4,087,239 A * 5/1978 Cline ...................... C30B 13/24
117/40
4,391,163 A * 7/1983 Benthake ................. F16H 1/46
475/337
(Continued)

FOREIGN PATENT DOCUMENTS

| JP | 8-11079 | 1/1996 |
| JP | 2004-314774 | 11/2004 |
| JP | 2012-51083 | 3/2012 |

OTHER PUBLICATIONS

International Search Report dated Oct. 15, 2013, directed to International Application No. PCT/JP2013/074897; 2 pages.

*Primary Examiner* — Gloria R Weeks
*Assistant Examiner* — Dariush Seif
(74) *Attorney, Agent, or Firm* — Morrison & Foerster LLP

(57) ABSTRACT

The feed axis device of a machine tool is equipped with first and second planetary gear speed reducers, each of which is obtained from an inner element, outer element, and intermediate elements that are disposed between the two, the elements being disposed so as to be mutually rotatable and combined in series so that one of the three elements is a fixed section, one of the two remaining elements is the input section and the other is the output section. The element that is the input section of the first speed reducer and the element that is the input section of the second speed reducer are connected to a single drive source. The element that is the output section of the first speed reducer and the element that is the output section of the second speed reducer are connected. The feed axis device is provided with an actuator.

8 Claims, 3 Drawing Sheets

(51) Int. Cl.
*B23Q 5/16* (2006.01)
*B23Q 11/12* (2006.01)
*B23Q 5/56* (2006.01)
*B23Q 17/09* (2006.01)
*F16H 1/28* (2006.01)

(52) U.S. Cl.
CPC .............. *B23Q 5/56* (2013.01); *B23Q 11/126* (2013.01); *B23Q 17/0976* (2013.01); *F16H 1/2863* (2013.01); *B23Q 2220/006* (2013.01)

(58) Field of Classification Search
CPC ........ B23Q 17/0976; B23Q 2220/0006; F16H 1/36; F16H 57/08; F16H 57/082; F16H 3/46; F16H 3/48; F16H 3/52; F16H 3/56
USPC ............................. 475/330, 5, 151; 173/216
See application file for complete search history.

(56) References Cited

U.S. PATENT DOCUMENTS

| | | | | |
|---|---|---|---|---|
| 4,939,949 A * | 7/1990 | Langenberg | ........... | B65G 23/36 475/10 |
| 5,240,462 A * | 8/1993 | Mochizuki | ........... | F16H 1/2863 475/341 |
| 5,679,089 A * | 10/1997 | Levedahl | ........... | F16H 1/46 475/330 |
| 6,461,265 B1* | 10/2002 | Graham | ........... | F16H 3/724 475/5 |
| 7,261,667 B2* | 8/2007 | Berger | ........... | F16H 1/2863 475/347 |
| 8,313,411 B2* | 11/2012 | Schafer | ........... | F16H 1/2863 475/331 |
| 8,597,154 B2* | 12/2013 | Polacco | ........... | F16H 1/2836 475/331 |
| 9,014,890 B2* | 4/2015 | Kwon | ........... | B60K 6/445 475/5 |
| 2003/0073537 A1* | 4/2003 | Lloyd | ........... | F16H 1/2863 475/331 |
| 2003/0123944 A1* | 7/2003 | Lanvin | ........... | B23Q 1/0009 409/172 |
| 2003/0171184 A1* | 9/2003 | Wige | ........... | F16H 1/46 475/248 |
| 2006/0240937 A1* | 10/2006 | Shiotsu | ........... | B62D 5/008 475/286 |
| 2007/0093354 A1* | 4/2007 | Berger | ........... | F16H 1/2863 475/346 |
| 2007/0287564 A1* | 12/2007 | Cho | ........... | B60K 6/365 475/5 |
| 2008/0153648 A1* | 6/2008 | Chen | ........... | F16H 47/04 475/72 |
| 2010/0048338 A1* | 2/2010 | Si | ........... | B60K 6/365 475/5 |
| 2011/0014001 A1* | 1/2011 | Takahashi | ........... | B23Q 1/04 409/131 |
| 2011/0070992 A1* | 3/2011 | Si | ........... | B60K 6/365 475/149 |
| 2011/0081216 A1* | 4/2011 | Ogura | ........... | B23Q 1/265 409/141 |
| 2012/0021867 A1* | 1/2012 | Rosmarin | ........... | F16H 57/12 475/331 |
| 2012/0046142 A1* | 2/2012 | Miyawaki | ........... | G03G 15/757 475/331 |
| 2012/0101624 A1* | 4/2012 | Ueno | ........... | B23Q 17/0976 700/173 |
| 2012/0143421 A1* | 6/2012 | Park | ........... | B60W 10/06 701/22 |
| 2013/0205947 A1* | 8/2013 | Takahashi | ........... | B23Q 1/5406 74/665 B |
| 2015/0367839 A1* | 12/2015 | Murata | ........... | H02K 7/003 475/2 |
| 2016/0229015 A1* | 8/2016 | Takahashi | ........... | B23Q 1/5406 |

\* cited by examiner

FEED AXIS DEVICE OF A MACHINE TOOL

CROSS-REFERENCE TO RELATED APPLICATIONS

This application is a U.S. National Phase patent application of International Patent Application No. PCT/JP2013/074897, filed on Sep. 13, 2013, which is hereby incorporated by reference in the present disclosure in its entirety.

FIELD OF THE INVENTION

The invention relates to a feed axis device of a machine tool.

BACKGROUND OF THE INVENTION

In machine tools for machining a workpiece with a rotating tool, chattering vibrations may be generated by machining, i.e., a process for chipping a workpiece by cutting edges of a rotating tool. Generally, the chattering vibrations are more likely generated when a hard-to-cut material is machined. Chattering vibrations deteriorate the machining accuracy of a workpiece. Chattering vibrations often result from insufficient rigidity of a transmission system due to backlash of gear wheels of a reduction drive used in a feed axis device of a machine tool.

In order to reduce chattering vibrations, sometimes the cutting condition, such as the rotational speed of a tool or the feeding speed, must be changed. This method usually involves reduction in machining efficiency. Therefore, Patent Literature 1 discloses a rotary feed axis device having two parallel gear trains for driving a single feed axis with driving forces from two servomotors. In the invention of Patent Literature 1, the two servomotors are controlled so as to increase the pressers between surfaces of engaging teeth of the two gear trains of the rotary feed axis device, when a sensor means, for detecting the vibrations generated in a machine tool machining a workpiece, detects vibrations.

Further, as a technology for removing backlash, Patent Literature 2 describes a driving apparatus for an industrial robot having a robot arm supported by two reduction drives. In the invention of Patent Literature 2, in order to remove backlash, the input shaft of one of the two reduction drives is connected to the input shaft of the other reduction drives.

PRIOR ART DOCUMENTS

Patent Literature 1: Japanese Unexamined Patent Publication No. 2012-051083
Patent Literature 1: Japanese Unexamined Patent Publication No. H08-011079

SUMMARY OF THE INVENTION

The rotary feed device of Patent Literature 1 is provided with a parallel system having two servomotors and two gear trains. This makes the rotary feed device and the control thereof complex.

The driving device of Patent Literature 2 increases the pressure between the surfaces of the engaging teeth of the two reduction devices in order to remove the backlash, but cannot adjust the pressure. Therefore, although the device enables a feed axis device of a machine tool to increase the rigidity of the power transmission system for heavy cutting or machining with a large-diameter tool, there is a problem that the heat generation is increased. On the other hand, although the pressure between the surfaces of the teeth should be reduced to reduce the heat generation, it is not possible to adjust the pressure. Further, for a machining condition under which chattering vibrations are likely generated, the feeding speed is decreased in order to reduce the heat generation, and therefore the performance under normal circumstances of the machine tool cannot be exerted.

The invention is directed to solve the above-described problems of the prior art, and the objective of the invention is to provide a feed device of a machine tool improved to vary the rigidity of a reduction drive depending on the machining condition.

In order to achieve the object, the invention, provides a feed axis device of a machine tool, comprising:

first and second epicyclic reducers each composed of an internal element, an outer element and an intermediate element disposed therebetween, the three elements being combined so that one of the three elements is a fixture part and one of the remaining two elements is an input part and the other is an output part;

the element forming the input part of the first reducer and the element forming the input part of the second reducer being connected to a single drive source;

the element forming the output part of the first reducer and the element forming the output part of the second reducer being connected to each other to provide a single output part; and an actuator for variably applying rotational torque to at least one of the fixture parts of the first and second reducers.

According to the invention, the actuator applies rotary torque to the fixture part of one of the first and second reduction drives so as to increase, for heavy cutting, the rigidity of the first and second reduction drives and the vibration damping capacity frictionally between the surfaces of engaging teeth of the two reduction drives, whereby chattering vibration can be reduced. For light cutting or fast feed, the friction between the surfaces of engaging teeth of the two reduction drives can be reduced by reducing the rotary torque applied to the one of the fixture parts whereby the heat generation is also reduced. Further, coolant flowing through the outer rings of the reduction drives prevents the reduction drives from being seized.

DETAILED DESCRIPTION OF THE INVENTION

Figure 1:
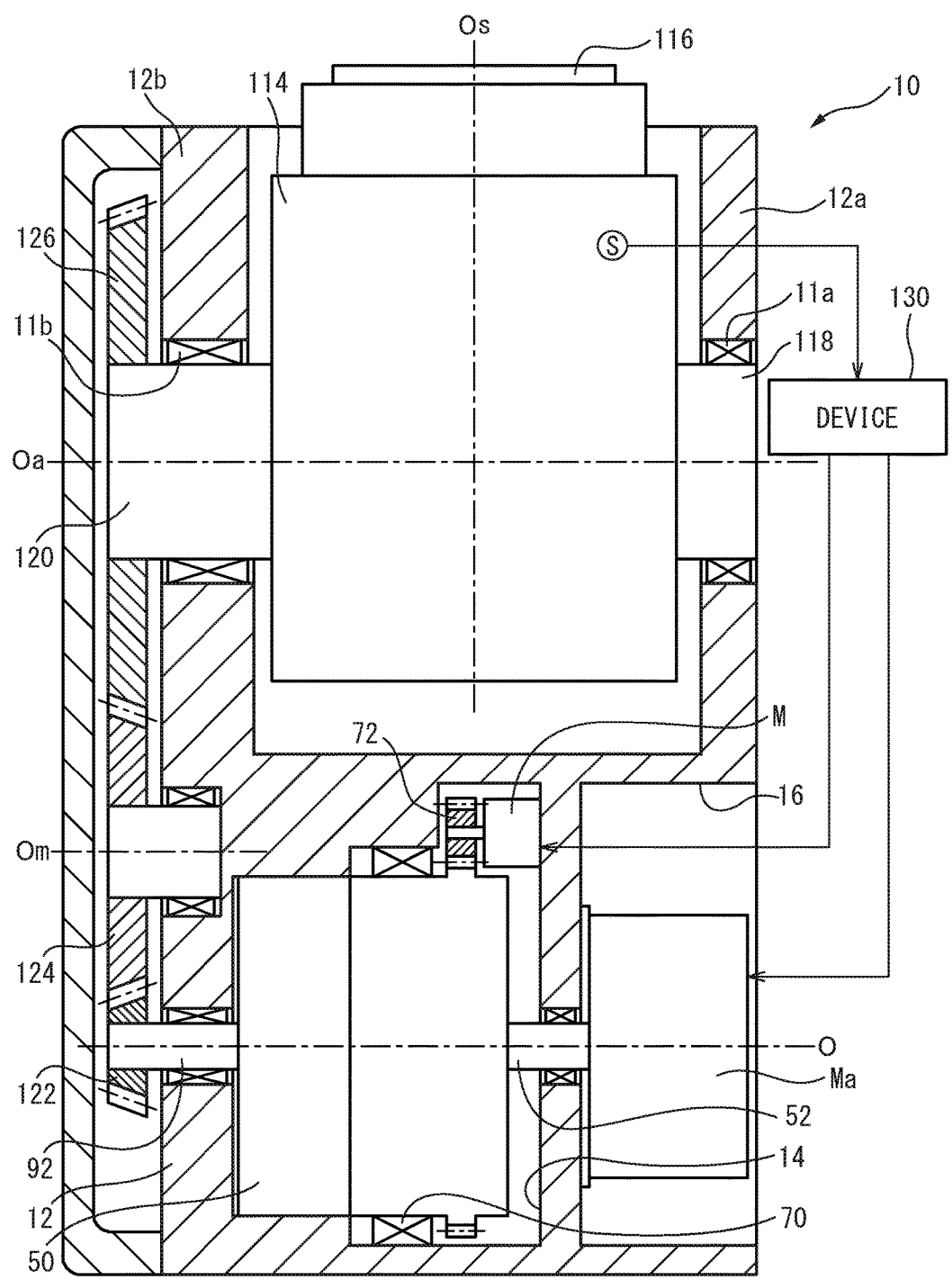
FIG. 1 is a section showing an example of the feed device of the invention applied to an A-axis feed device for tilting a spindle head of a machine tool.
Figure 2:
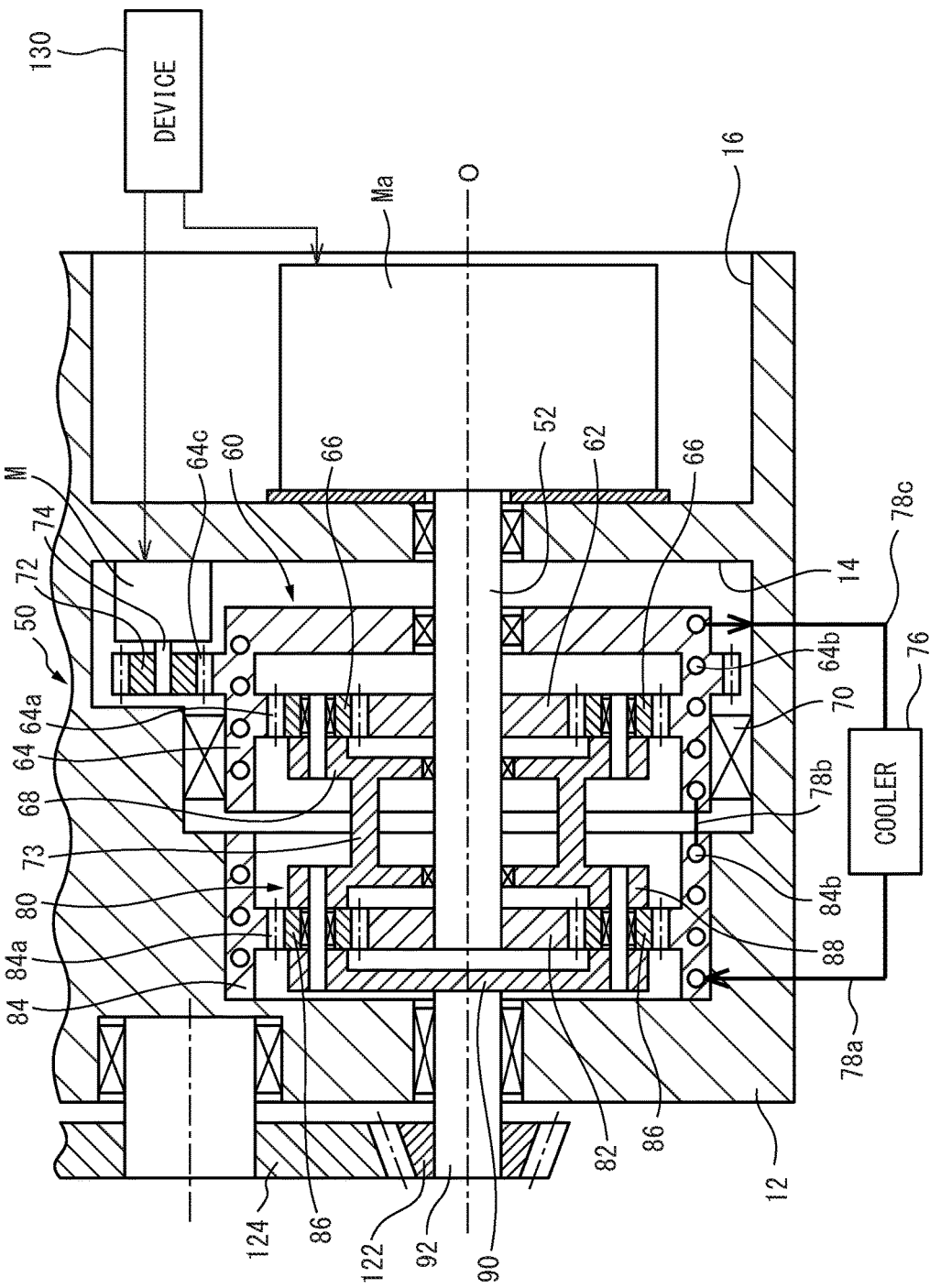
FIG. 2 is a enlarged section of the feed device of the machine tool shown in FIG. 1.
Figure 3:
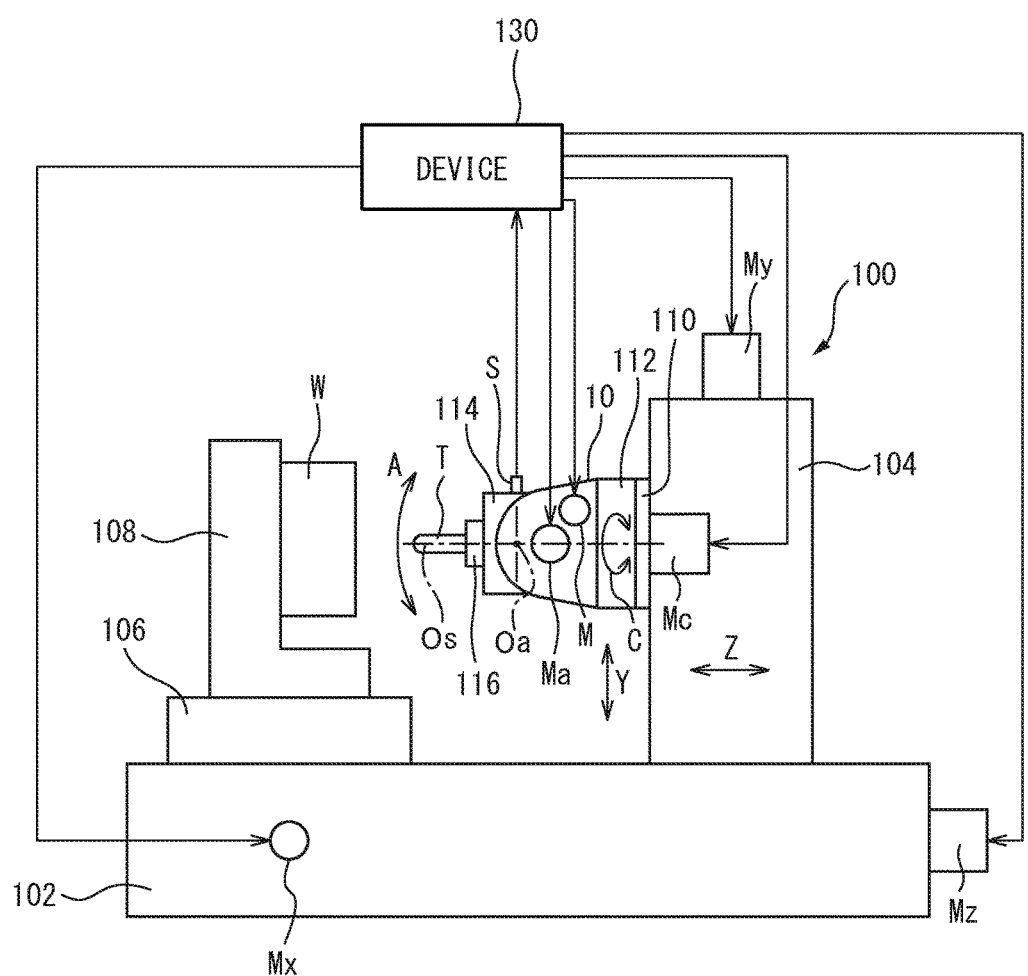
FIG. 3 is a side view showing an example of a machine tool having the feed device of the invention.

With reference to FIGS. 1-3, an embodiment of a controlling device for a feed axis device and a machine tool according to the invention will be described below.

With reference to FIG. 3, an example of a machine tool having a feed axis device of the invention will be described.

In FIG. 3, a machine tool 100 is a five-axis control machine tool having a tilting spindle head, and comprises a bed 102, providing a base secured to a floor of a factory. A column 104 is mounted to the bed 102 for horizontal motion in Z-axis direction (the left and right direction in FIG. 3). In front of the column 104, a table 106 is mounted to the top face of the bed 102 for horizontal motion in X-axis direction (perpendicular to the plane of FIG. 3). A workpiece W is mounted to the table 106 by a workpiece mount 108.

A headstock 110 is mounted to the front face of the column 104 for motion in Y-axis direction (vertical direction). A swivel base 112 is mounted to the headstock 110 for C-axis rotational feed around the Z-axis. A spindle head support 10, providing an A-axis feed device as an example of a feed axis device of the invention, is mounted to the headstock 110. A spindle head 114 is mounted to the spindle head support 10 for A-axis rotational feed around a tilting axis Oa parallel to the X-axis. An acceleration sensor S, providing a chattering vibration detecting means, is attached to the spindle head 114. The vibration detecting means S may comprise other sensor, such as a displacement sensor or a speed sensor.

The table 106 is mounted for reciprocation along a pair of X-axis guide rails (not shown) extending in the X-axis direction on the top face of the bed 102. The bed 102 is provided with an X-axis feed device for reciprocating the table 106 along the X-axis guide rails, including a ball screw (not shown) extending in the X-axis direction and an X-axis servomotor Mx connected to an end of the ball screw. The table 106 is provided with a nut (not shown) which engages the ball screw.

The head stock 110 is mounted for reciprocation along a pair of Y-axis guide rails (not shown) extending in the Y-axis direction (up-and-down direction in FIG. 3) on the front face of the column 104. The column 104 is provided with a Y-axis feed device for reciprocating the head stock 110 along the Y-axis guide rails, including a ball screw (not shown) extending in the Y-axis direction and a Y-axis servomotor My connected to an end of the ball screw. The head stock 110 is provided with a nut (not shown) which engages the ball screw.

The column 104 is mounted for reciprocation along a pair of Z-axis guide rails (not shown) extending in the Z-axis direction on the top face of the bed 102. The bed 102 is provided with a Z-axis feed device for reciprocating the column 104 along the Z-axis guide rails, including a ball screw (not shown) extending in the Z-axis direction and a Z-axis servomotor Mz connected to an end of the ball screw. The column 104 is provided with a nut (not shown) which engages the ball screw.

The head stock is further provided with a C-axis servomotor Mc for rotationally feeding the spindle head support 10 and the spindle head 114 around the C-axis. The spindle head support 10 is provided with an A-axis servomotor Ma, providing an A-axis rotational drive for rotationally feeding the spindle head 114 around the tilting axis Oa. The spindle head support 10 is further provided with a preloading servomotor M, providing an actuator for adjusting the rigidity of the drive system of a reduction drive 50, which will be described below.

The X-axis servomotor Mx, the Y-axis servomotor My, the Z-axis servomotor Mz, the A-axis servomotor Ma, the C-axis servomotor Mc and the preloading servomotor M are connected to an NC device 130. The acceleration sensor S is also connected to the NC device 130. The NC device 130 controls the electric power (current value), supplied to the X-axis servomotor Mx, the Y-axis servomotor My, the Z-axis servomotor Mz, the A-axis servomotor Ma, the C-axis servomotor Mc and the preloading servomotor M.

Accordingly, a tool T attached to the end of the spindle 116 and a workpiece W mounted to the table 106 are relatively moved by relatively feeding the X-, Y-, Z-, A- and C-axes in accordance with an NC program whereby the machine tool 100 machines a workpiece W with the tool T.

With reference to FIGS. 1 and 2, the configuration of the spindle head support 10, providing the A-axis feed device as an example of the invention, will be described.

The spindle head support 10 comprises a housing 12 which contains the A-axis servomotor Ma for rotationally driving the reduction drive 50 and the A-axis. In particular, the housing 12 defines a gear wheel chamber 14, for containing the reduction drive 50 at a rear side of the housing, and a recess 16 for containing the A-axis servomotor Ma. The A-axis servomotor Ma has an output shaft 52 which extends along an axis O parallel to the tilting axis Oa and is supported by the housing 12 for rotation.

The spindle 114 is disposed between a pair of side walls 12a and 12b of the housing 12. The spindle 114 has tilting shafts 118 and 120 extending opposite the side of the spindle along a common line. The tilting shafts 118 and 120 are supported for rotation by bearings 11a and 11b disposed in the side walls 12a and 12b. Thus, the tilting shafts 118 and 120 define the tilting axis Oa perpendicular to the Z-axis when the spindle head 114 is mounted to the spindled head support 10 through the tilting shafts 118 and 120 and the bearings 11a and 11b.

The reduction drive 50 comprises an input epicyclic gear assembly 60, providing a first epicyclic reducer, and an output epicyclic gear assembly 80, providing a second epicyclic reducer. The input epicyclic gear assembly 60 comprises an internal element composed of a sun gear 62, an intermediate element composed of a plurality of planet gears 66, engaging the sun gear 62, and a planetary carrier 68 for carrying the planet gears 66 and an outer element composed of an outer ring 64 defining inner teeth 64a engaging the planet gears 66. The sun gear 62 is coupled to the output shaft 52 of the A-axis servomotor Ma.

The outer ring 64 defines outer teeth 64c. The outer teeth 64c engage a pinion 72. The pinion 72 is secured to an output shaft 74 of the preloading servomotor M, providing an actuator for applying an adjustable rotational torque to the outer ring 64. In the present embodiment, while the outer ring 64 is rotationally supported by the gear chamber 14 by a bearing 70, the outer ring 64 is held so as not to rotate relative to the inner surface of the gear chamber 14 by applying to the outer ring a torque as a preload by the preloading servomotor M through the engagement between the outer teeth 64c and the pinion 72. Incidentally, the preloading servomotor M may be an electric motor, a hydraulic motor or a pneumatic motor. Further, the preloading servomotor M may comprise a linear actuator such as a hydraulic cylinder with the pinion 72 being replaced with a rack gear.

The output epicyclic gear assembly 80 comprises an internal element composed of a sun gear 82, an intermediate element composed of a plurality of planet gears 86, engaging the sun gear 82, and first and second planetary carriers 88 and 90 carrying the plurality of planet gears 86, and an outer element composed of an outer ring 64 defining inner teeth 64a engaging the planet gears 66. The sun gear 62 is coupled to the output shaft 52 of the A-axis servomotor Ma. The outer ring 84 is secure to a stationary part of the spindle head support 10 e.g., the inner peripheral surface of the gear chamber 14. The outer ring 84 is secured by a suitable means such as a key and groove, a spline, and interference fitting, so as not to move, in particular in the peripheral direction. The first planetary carrier 88 is coupled to the planetary carrier 68 of the input epicyclic gear assembly 60 so as to rotate integrally therewith by a connection 73. The second planetary carrier 90 of the output epicyclic gear assembly 80 is coupled to an output shaft 92 of the reduction drive 50.

A drive gear 122 is secured to the output shaft 92. The drive gear 122 engages an intermediate gear 124, rotatably supported around an axis Om. The intermediate gear 124 engages a driven gear 126 secured to one 120 of the tilting shafts. The rotation of the A-axis servomotor Ma is transmitted to the spindle head 114 via the reduction drive 50, the drive gear 122, the intermediate gear 124, the driven gear 126 and the tilting shaft 120. This allows the spindle head 114 to be rotationally fed in the A-axis feed direction around the tilting axis Oa.

In the present embodiment, the sun gears 62 and 82 provide input parts connected to a drive, i.e., the A-axis servomotor Ma. The planet gears 66 and 86 and the planetary carriers 68, 88 and 90 provide output parts connected to the output shaft 92. The outer rings 64 and 84 provide fixture parts.

The outer rings 64 and 84 respectively define cooling passages 64b and 84b spirally extending in the peripheral direction. The cooling passages 64b and 84b are connected to a cooler 76 in series via cooling conduits 78a, 78b and 78c. Thus, coolant is supplied to the cooling passage 84b from the cooler 76 through the conduit 78a, then to the cooling passage 64b from the cooling passage 84b through the cooling conduit 78b, and then returns to the cooler 76 from the cooling passage 64b through the cooling conduit 78b whereby it is circulated. The cooler 76 is operated to control the temperature of the coolant adjusted to the temperature of the bed 102 of the machine tool 100 whereby the heat generated in the reduction drive 50 is removed.

When the machine tool 100 is operated, the preloading servomotor M applies the torque via pinion 72 to the outer ring 64, providing the fixture part, of the input epicyclic gear assembly 60. This allows the pressure between the engaging teeth of the input epicyclic gear assembly 60 and the output epicyclic gear assembly 80 to be adjusted so as to adjust the rigidity of the transmission system.

Under normal machining condition without chattering vibration generated, the NC device 130 controls the electric power (the current value) supplied to the X-axis servomotor Mx, Y-axis servomotor My, Z-axis servomotor Mz, A-axis servomotor Ma and C-axis servomotor Mc so as to control the respective feed aces of X-, Y-, Z-, A- and C-aces in accordance with a machining program to carry out the machining process. In order to remove the backlash, the NC device 130 controls the electric power (the current value) supplied to the preloading servomotor M so as to apply pressure between the contacting surfaces of the engaging teeth of the input epicyclic gear assembly 60 and the output epicyclic gear assembly 80. For example, when carrying out a heavy duty cutting process or a process using a large-diameter tool, the electric power (current value) supplied to the preloading servomotor M is increased to increase the pressure between the contacting surfaces of the engaging teeth of the input epicyclic gear assembly 60 and the output epicyclic gear assembly 80. On the other hand, for light duty cutting or fast feed, the electric power (current value) supplied to the preloading servomotor M is reduced to reduce the pressure. The control of the electric power (current value) supplied to the preloading servomotor M based on such a machining condition may be described in the machining program with M-code. Further, the NC device may control the preloading servomotor M based on determination that a large-diameter tool is attached based on the tool number command for automatic tool change, determination of heavy cutting or light cutting based on the load of the spindle driving motor or determination that the next action is fast feed based on the fast feed command for the A-axis. The preloading servomotor M may be constantly supplied with electric power more than zero or may be supplied with electric power by ON-OFF control. When OFF, mechanical break is applied to the output shaft 74 of the preloading servomotor M.

Further, during the operation of the machine tool 100, when the acceleration sensor S detects chattering vibrations, the NC device 130 may increase the electric power (current value) supplied to the preloading servomotor M to increase the rotational torque applied to the outer ring 64 via the pinion 72 whereby the pressure between the surfaces of the engaging teeth of the input epicyclic gear assembly 60 and the output epicyclic gear assembly 80. This increases the frictional damping capacity between the surfaces of the teeth. Therefore, the chattering vibrations are converted into heat by generating large friction between the teeth in the reduction drive. Thus, the chattering vibration is damped. The chattering vibrations may be determined for example when the amplitude V of vibrations, detected by the acceleration sensor S during machining, continuously exceeds a predetermined threshold value for a predetermined time period. At that time, the NC device 130 may control the current value supplied to the preloading servomotor M proportionally to difference $\Delta V$ between the present amplitude V of the vibration and the threshold value V0.

In the above described embodiment, the sun gears 62 and 82 provide the input parts, the planet gears 66 and 86 and the planetary carriers 68, 88 and 90 provide the output parts, and the outer rings 64 and 84 provide the fixture parts. However, the invention is not limited to this configuration. The sun gears 62 and 82 may provide the input parts, the planet gears 66 and 86 and the planetary carriers 68, 88 and 90 may provide the fixture parts, and the outer rings 64 and 84 may provide the output parts. Alternatively, the sun gears 62 and 82 may provide the fixture parts, the planet gears 66 and 86 and the planetary carriers 68, 88 and 90 may provide the output parts, and the outer rings 64 and 84 may provide the input parts. Further, the sun gears 62 and 82 may provide the fixture parts, the planet gears 66 and 86 and the planetary carriers 68, 88 and 90 may provide the input parts, and the outer rings 64 and 84 may provide the output parts. Further, the sun gears 62 and 82 may provide the output parts, the planet gears 66 and 86 and the planetary carriers 68, 88 and 90 may provide the input parts, and the outer rings 64 and 84 may provide the fixture parts. Furthermore, the sun gears 62 and 82 may provide the output parts, the planet gears 66 and 86 and the planetary carriers 68, 88 and 90 may provide fixture parts, and the outer rings 64 and 84 may provide the input parts.

While, the rotary torque is applied to the outer ring of the input epicyclic gear assembly 60, providing the fixture part, by the preloading motor, providing the actuator, in the above described embodiment, the rotary torque may be applied to the outer ring of the output epicyclic gear assembly 80. Further, mutually oppositely directed rotary torques may be applied to the input and output epicyclic gear assemblies 60 and 80.

Furthermore, while the reduction drive 50, providing an epicyclic reducer, is composed of a typical planetary gear mechanism in the above described embodiment, the reduction drive 50 may comprise RV precision reduction gears (Registered Trademark) available in the market from Nabtesco Corporation in Tokyo, Japan, or Harmonic Drive (Registered Trademark) available in the market from Harmonic Drive Systems Inc. in Tokyo, Japan. Furthermore, while the reduction drive 50 is applied to the transmission system of the A-axis in the above described embodiment, it may be provided for the transmission system of the other rotary feed axis, i.e., the B-axis and/or the C-axis, and/or to the linear feed axis, i.e., the X-, Y- and/or Z-axis.

REFERENCE SIGNS LIST

10 Spindle Head Support
12 Housing
50 Reduction drive
52 Output Shaft
60 Input Epicyclic Gear Assembly
62 Sun Gear
64 Outer Ring
66 Planet Gear
68 Planetary Carrier
72 Pinion
73 Connection
74 Output Shaft
76 Cooler
80 Output Epicyclic Gear Assembly
82 Sun Gear
84 Outer Ring
86 Planet Gear
88 First Planetary Carrier
90 Second Planetary Carrier
92 Output Shaft
100 Machine Tool
102 Bed
104 Column
104 Table
106 Table
110 Head Stock
112 Swivel Base
114 Spindle Head
116 Spindle
130 NC device

The invention claimed is:

1. A feed axis device of a machine tool, comprising:
a driving motor having an output shaft;
a speed reducer comprising first and second epicyclic reducers each having a sun gear, a planetary carrier holding a plurality of planetary gears, and an outer ring defining inner teeth, the first and second epicyclic reducers being combined with each other so that,
the sun gear of the first reducer and the sun gear of the second reducer are connected to the output shaft of the driving motor;
the planetary carrier of the first reducer and the planetary carrier of the second reducer are connected to each other to provide an output part of the speed reducer, and
one of the outer rings of the first and second reducers is fixed;
a sensor configured to detect chattering vibration generated when machining a workpiece; and
an actuator for variably applying rotational torque, based on a machining condition or amplitude of chattering vibration, to the other of the outer rings of the first and second reducers in order to change contacting pressure between the teeth of the speed reducer engaging with each other.

2. The feed axis device according to claim 1, wherein the actuator has a rotary output part to which a pinion is secured, and
wherein the one of the outer rings defines outer teeth along the outer periphery for engaging with the pinion.

3. The feed axis device according to claim 1, wherein the actuator has a linearly moving output part to which a rack gear is attached, and wherein the one of the outer rings is provided with outer teeth along the outer periphery thereof for engaging with the rack gear.

4. The feed axis device according to claim 1, wherein the feed axis device is a rotary feed axis of a machine tool.

5. The feed axis device according to claim 1, wherein the outer rings of the planetary gear mechanisms define cooling passages through which coolant flows.

6. The feed axis device according to claim 1, wherein the machine tool has a spindle head configured to rotationally support a spindle an end of which a tool is attached to for machining a workpiece, and a headstock configured to support the spindle head, wherein
the sensor is attached to the spindle head.

7. The feed axis device according to claim 6, wherein the spindle head is supported on the headstock by the speed reducer for rotation about the output shaft of the driving motor.

8. The feed axis device according to claim 1, further comprising an NC device configured to receive signals from the sensor, and to read a machining program for machining a workpiece with the machine tool, wherein the NC device increases electric power supplied to the actuator when a heavy duty cutting process or a process using a large-diameter tool is determined in the machining program, or when chattering vibration is determined based on the signals from the sensor.

* * * * *